United States Patent
Englund et al.

(10) Patent No.: US 8,135,017 B2
(45) Date of Patent: Mar. 13, 2012

(54) ARRANGEMENT AND METHOD IN A MOBILE COMMUNICATION NETWORK

(75) Inventors: Eva Englund, Linköping (SE); Stefan Parkvall, Stockholm (SE); Gunnar Bark, Linköping (SE); Ke Wang Helmersson, Linköping (SE); Mats Sågfors, Kyrkslätt (FI); Rong Hu, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 706 days.

(21) Appl. No.: 12/095,848

(22) PCT Filed: Dec. 1, 2005

(86) PCT No.: PCT/SE2005/001820
§ 371 (c)(1),
(2), (4) Date: Oct. 13, 2008

(87) PCT Pub. No.: WO2007/064266
PCT Pub. Date: Jun. 7, 2007

(65) Prior Publication Data
US 2009/0238148 A1    Sep. 24, 2009

(51) Int. Cl.
*H04L 12/28* (2006.01)
(52) U.S. Cl. ........ 370/394; 370/320; 370/335; 370/342; 370/441; 455/13.4; 455/522; 455/69

(58) Field of Classification Search .................. 455/13.4, 455/522, 69; 370/320, 335, 342, 441, 394
See application file for complete search history.

(56) References Cited

U.S. PATENT DOCUMENTS

| 7,414,989 B2 * | 8/2008 | Kuchibhotla et al. | 370/329 |
| 7,561,894 B2 * | 7/2009 | Nishio et al. | 455/522 |
| 2004/0018850 A1 | 1/2004 | Ishiguro et al. | |
| 2005/0143114 A1 * | 6/2005 | Moulsley et al. | 455/522 |
| 2005/0201337 A1 * | 9/2005 | Heo et al. | 370/335 |

FOREIGN PATENT DOCUMENTS

| WO | WO 2004/102834 A1 | 11/2004 |
| WO | WO 2005/020464 A1 | 3/2005 |
| WO | WO 2006046894 A1 | 5/2006 |

* cited by examiner

*Primary Examiner* — Christopher Grey
(74) *Attorney, Agent, or Firm* — Roger S. Burleigh

(57) ABSTRACT

The invention relates to a method and an arrangement for obtaining efficient radio resource allocation in a mobile communication network comprising a communication network entity (15) and at least one user equipment (18) transmitting data to said mobile communication network entity (15) over a radio interface. A first data transmission from said at least one user equipment (18) is received, whereby said first transmission is decoded and a message (ACK/NACK) based on a result of the decoding is sent on a downlink channel (13) comprising information of said first received data transmission. A second data transmission from said at least one user equipment (18) is received, whereby the power on said downlink channel (13) is adjusted depending on the result of said decoding and the content in said received second data transmission.

10 Claims, 2 Drawing Sheets

ARRANGEMENT AND METHOD IN A MOBILE COMMUNICATION NETWORK

CROSS-REFERENCE TO RELATED APPLICATION

This application is a national stage application, filed under 35 U.S.C. §371, of PCT International Application No. PCT/SE2005/001820, filed on Dec. 1, 2005, the disclosure and contents of which is incorporated herein by reference as if set forth in its entirety; the PCT application was published in the English language as International Publication No. WO 2007/064266 on Jun. 7, 2007.

TECHNICAL FIELD

The present invention relates to the field of mobile communication networks and, particularly, to an arrangement allowing for allocating radio resources in a mobile communication network as well as a method for such allocation.

BACKGROUND OF THE INVENTION

In many communication systems retransmission protocols are used in order to handle erroneous transmissions, i.e. transmission attempts where the receiving end is not able to decode the content. When a transmission attempt has failed the receiving end informs the transmitting end through a feedback channel. One type of feedback information consists of an indication on whether the transmission attempt was successful or not. For a successful transmission the receiver acknowledges the transmission (ACK) while a negative acknowledge (NACK) follows an unsuccessful transmission attempt. The transmitting end uses the feedback information to determine whether a retransmission and/or additional redundancy is needed or not.

In some cases, for example in the uplink of Code Division Multiple Access (CDMA) systems in soft handover, several receiving units (Node Bs) may be involved in the reception of a transmission. The reception attempts from the receiving Node Bs are combined in centralized units, such as the Radio Network Controller (RNC) in the Wideband Code Division Multiple Access (WCDMA) specifications, and a retransmission is only needed in case none of the receiving units are successful in the reception.

In current proposals for enhancing the CDMA standards (WCDMA and CDMA2000) it is proposed that the feedback information (ACK/NACK) is to be generated directly in the Node Bs to enable faster retransmission. Each receiving end (Node B) involved in the reception has a separate feedback channel to transmit an ACK or a NACK depending on the outcome of the decoding attempt. The transmitting end (user equipment) performs a retransmission only if a NACK is obtained from all receiving ends. If an ACK is received from any of the receiving units the transmission attempt is considered successful and no retransmission is performed. This means that although an individual receiving unit was not able to decode and responded with a NACK, the combined transmission outcome may have been successful.

In many cases the Hybrid Automatic Retransmission Request (HARQ) processes perform "soft combining", i.e. the retransmitted signal is combined with the previous transmission(s) to increase the probability of successful reception. In these cases all the receiving units must know if a transmission is a retransmission, which should be combined with previous transmissions, or if it is an initial transmission corresponding to new data.

To inform all receiving units of the combined outcome the transmitting unit indicates, for each transmission, if it is a retransmission or a new transmission. This is, for example done by transmitting a Retransmission Sequence Number (RSN) in combination with each transmission. The RSN is used to convey to all receiving units the transmission number for each transmission. If the RSN indicates that the current transmission is a new transmission the transmission is not combined with previous transmissions. If the RSN indicates to all receiving units that the current transmission is a retransmission the transmission is a repetition of previously transmitted data and/or additional redundancy (check bits) related to previously transmitted data which should be combined with previous transmissions.

In previous releases of the standards the combining of the uplink transmissions is done in the RNC. If at least one Node B is able to decode a transmission, it is acknowledged (ACK).

In case of an enhanced uplink, which is currently being standardized within the Third Generation Partnership Project (3GPP) for WCDMA, each Node B involved in the decoding transmits a separate ACK/NACK feedback. The user equipment considers the feedback information from e.g. two Node Bs. As an example, a first Node B is able to receive the transmission and sends an ACK to the user equipment on the feedback channel, while a second Node B was not successful and transmits a NACK. If any of the Node Bs send an ACK there is no need for a retransmission so the user equipment does not retransmit. Observe that the second Node B does not know if the first Node B was successful or not and must be informed by the user equipment. Since the transmission was successful the user equipment increments the RSN and transmits the same transmission in combination with the next transmission. The second Node B is thereby informed that the combined transmission was successful and that the new transmission is not a retransmission of previous data.

For the retransmission protocol to be stable the feedback channel that carries the ACK/NACK information must be reliable, errors in the signalling will cause protocol errors and increased delays and degraded throughput. In order to achieve reliable feedback information the power needed may be substantial and this will affect the performance of the downlink communication as there will be less power available. The problem is especially serious in situations where several receivers are involved in the reception (soft handover). In these cases additional power must be added to the feedback channel to guarantee reliable reception. The existing solution is to use additional power for these situations regardless if it is needed or not leading to over-provisioning and excessive power consumption. Less power is then available for downlink oriented data leading to decreased downlink performance.

There is, therefore, a need for an improved method and arrangement for efficiently allocating the available radio resources in a mobile communication network.

SUMMARY OF THE INVENTION

Accordingly, it is an objective with the present invention to provide an improved method for obtaining efficient radio resource allocation in a mobile communication network comprising a communication network entity and at least one user equipment transmitting data to said mobile communication network entity over a radio interface.

This objective is achieved through a method of receiving a first data transmission from said at least one user equipment, sending a message on a downlink channel comprising information of said first received data transmission, receiving a second data transmission from said at least one user equipment, and, adjusting a power on said downlink channel depending on the content in said sent message and the content in said received second data transmission.

According to one aspect of the inventive method, the power on the downlink channel is increased when the content in said received second data transmission differs from an expected content.

According to another aspect of the inventive method, the power on the downlink channel is decreased when said content in said received second data transmission corresponds with an expected content.

Another objective with the present invention is to provide an improved arrangement in a communication network entity for obtaining efficient radio resource allocation in a mobile communication network comprising said communication network entity and at least one user equipment transmitting data to said mobile communication network entity over a radio interface.

This other objective is achieved through providing an arrangement comprising means for receiving a first data transmission from said at least one user equipment, means for sending a message on a downlink channel comprising information of said first received data transmission, means for receiving a second data transmission from said at least one user equipment, and, means for adjusting a power on said downlink channel depending on said sent message and said received second data transmission.

According to one aspect of the inventive arrangement, the means for adjusting the power is arranged to increase the power on said downlink channel when said content in said received second data transmission differs from an expected content.

According to another aspect of the inventive arrangement, the means for adjusting the power is arranged to decrease the power on said downlink channel when said content in said received second data transmission corresponds with an expected content.

Thanks to the provision of an arrangement and a method, which detect errors in the feedback information for HARQ processes and which use this information to adjust the power for the feedback channel, the default power setting can be lowered leaving more power for downlink oriented traffic. For example in soft handover the power offset only needs to be applied on the poor links rather than on all links.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PREFERRED EMBODIMENTS

Figure 1:
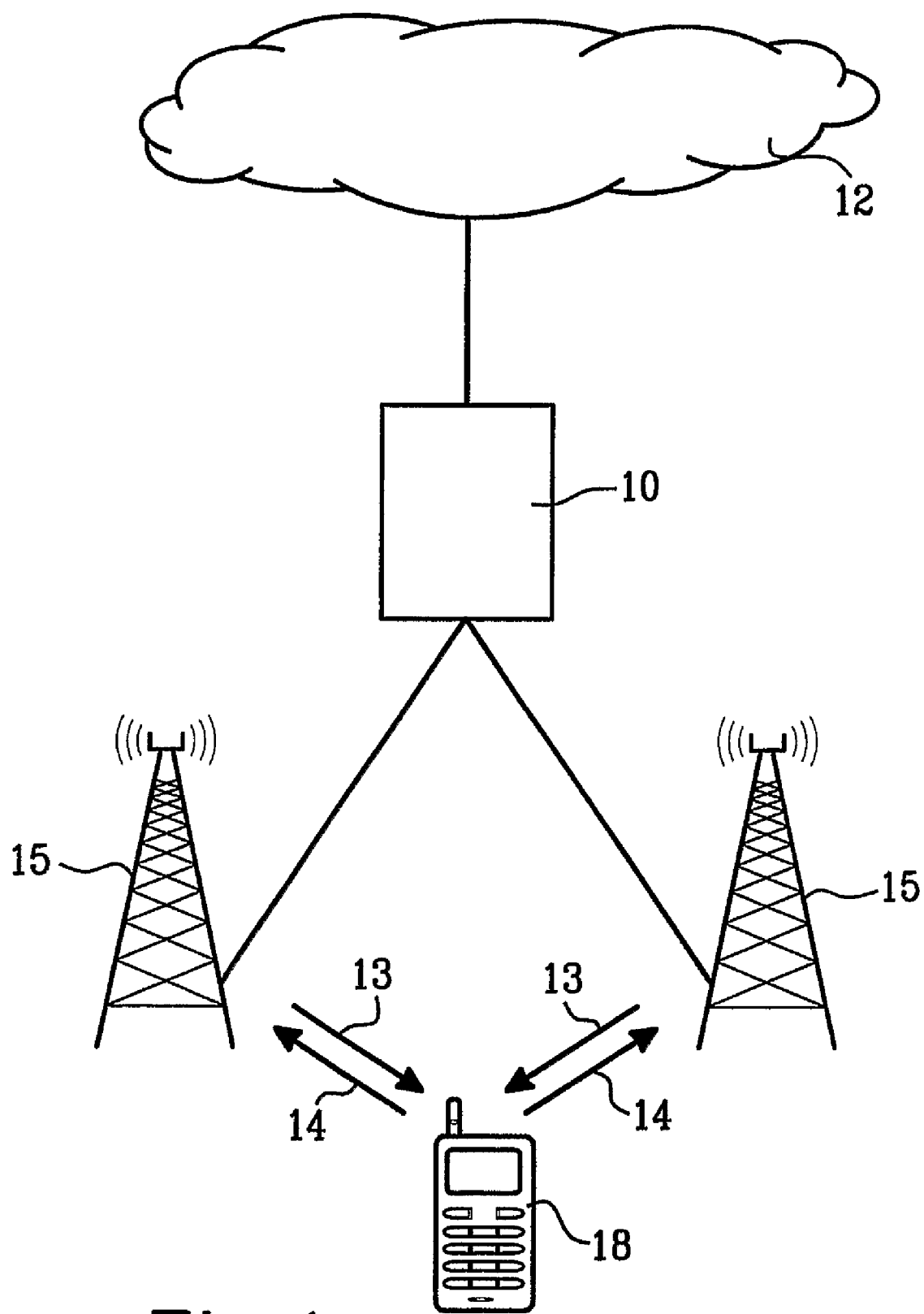
FIG. 1 shows an exemplary block diagram of a communication network architecture according to the present invention.

A network according to a standard like 3GPP comprises a Core Network (CN), Radio Access Networks (RAN) and User Equipments (UE) attached to a RAN, such as the UMTS Terrestrial Radio Access Network (UTRAN) architecture. FIG. 1 shows an exemplary network like this, wherein the UTRAN comprises one or more Radio Network Controllers (RNCs) 10 and one or more Node B 15 which are connected to the RNC 10 through the Iub-interface. The UTRAN connects to the core network 12 through the Iu-interface. The UTRAN and the CN 12 provide communication and control for a plurality of user equipments 18.

Node B 15 is the function within the UTRAN that provides the physical radio link between the user equipments 18 and the network. Along with the transmission and reception of data across the radio interface the Node B 15 also applies the codes that are necessary to describe channels in a CDMA system. In Node B 15, there is provided a scheduler which controls when a user equipment is transmitting and at what data rate. There is also provided the Hybrid Automatic Retransmission Request (HARQ), which allows Node B 15 to rapidly request retransmissions of erroneously received data entities.

The invention relates to a method and arrangement for detecting errors in the feedback information for HARQ processes and to use this information to adjust the power for the feedback channel. By detected errors and only boosting the power whenever needed, the default power setting can be lowered leaving more power for downlink oriented traffic.

If a Node B 15 has transmitted an ACK and the user equipment 18 correctly detects the ACK, the user equipment 18 should respond with new data for the next transmission in that HARQ process and not a retransmission. If the user equipment 18 instead responds with a retransmission although the Node Bs have sent an ACK there must have been a signalling error. One reason for the error can be that the user equipment 18 misinterpreted the ACK as an NACK. This is an indication that the feedback channel 13 quality is too poor and that the power for the feedback channel must be increased. This error event can be used to increase the power on the ACK/NACK feedback channel 13.

According to a preferred embodiment of the present invention, the Node B 15 monitors the event that a retransmission occurs although the previous transmission in that HARQ process was acknowledged. The occurrence of this error event is further used to adjust the power on the feedback channel 13. The invention could also be used to control the power of other downlink control channels such as the High-Speed Shared Control Channel (HS-SCCH). The HS-SCCH is used to transmit control information for the High-Speed Downlink Shared Channel (HS-DSCH) consisting of scheduling information and transport formats for downlink oriented traffic. The power adjustment is preferably done by using a "jump algorithm" where each occurrence of the error event triggers an increase of feedback power with a predefined step otherwise the power is gradually decreased by a fraction of the predefined step.

The Node B 15 can also take into account the reliability of the RSN signal when adjusting the power. If the RSN signal is reliable it is more probable that the ACK was interpreted as a NACK and the power increase could be larger compared with the case where the RSN signal quality is poor.

When the user equipment 18 not is in soft handover, also NACK's is used for detecting error events. If the Node B 15 has sent a NACK for a transmission and does not receive a retransmission, the NACK may have been misinterpreted as an ACK. This error event is then used to adjust the power on the feedback channel 13 (and optionally also other downlink channels as discussed above) similarly to the ACK-to-NACK error case described above. Even in soft handover such a scheme may be used but only when the uplink signal quality is judged to be good. For example, if a Signal-to-Interference Ratio (SIR) estimate is close to the SIR target. Statistics on the fast power control commands (TPC) can also be used to judge on signal quality.

In a preferred embodiment of the invention, the detected error event triggers a report to the RNC 10.

The arrangement in Node B 15 according to the present invention for obtaining efficient radio resource allocation in a mobile communication network comprising the Node B 15 and at least one user equipment 18 transmitting data to the Node B 15 over a radio interface, thus comprises:

- means for receiving a first data transmission from the user equipment 18 on an uplink channel 14, such as an Enhanced Dedicated Channel (E-DCH);
- means for decoding said first data transmission and obtaining a result of the decoding, i.e. the result is either a success or a fail.
- means for sending a message on a downlink channel 13 based on the result of the decoding of the first received data transmission, i.e. the message is either an ACK or a NACK message;
- means for receiving a second data transmission from the user equipment 18 on an uplink channel 14, such as the E-DCH;
- means for adjusting a power on said downlink channel 13 depending on the result of the decoding of the first transmission (or the sent message based on the result of the decoding) and the received second data transmission. The power is either increased with a predefined step if the content in the received second data transmission differs from an expected content or decreased with a fraction of the predefined step if the content in the received second data transmission corresponds with an expected content. Thus, if the sent message is an ACK, the means for adjusting the power is arranged to increase the power if the received second data transmission is a retransmission of the received first data transmission. Likewise, if the sent message is a NACK, the means for adjusting the power is arranged to increase the power if the received second data transmission differs from the received first data transmission, i.e. is a transmission containing new data. On the other hand, the means for adjusting the power is arranged to decrease the power if the sent message is an ACK and the received second data transmission is a new transmission or if the sent message is a NACK and the received second data transmission is a retransmission of the received first data transmission. The RSN is used to determine whether the transmission is a retransmission or a new transmission;
- optionally, means for deriving an error report when the content in the received second data transmission differs from an expected content and means for sending the error report to a superior entity such as the RNC 10.

Figure 2:
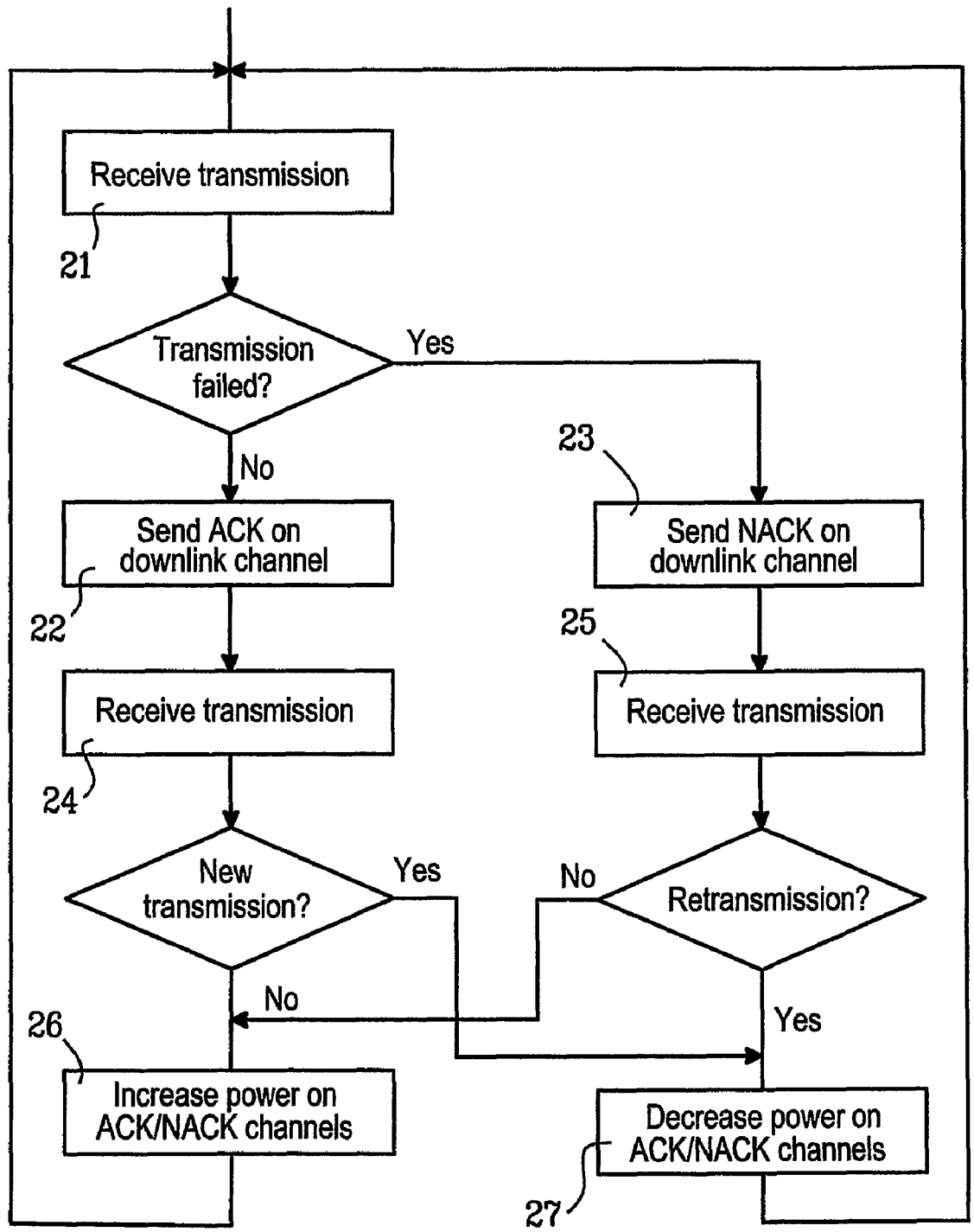
FIG. 2 is a flowchart showing the inventive process for adjusting power on the downlink feedback channels.

In a preferred embodiment of the present invention, the procedure for obtaining efficient radio resource allocation in a mobile communication network comprising a Node B and at least one user equipment transmitting data to the Node B over a radio interface, is shown in FIG. 2. In step 21, the node B is receiving a first data transmission from the user equipment on an uplink channel such as the E-DCH. The first data transmission is decoded and a result of the decoding is obtained, i.e. a success or a fail. If the transmission succeeded, the Node B is sending a message on a downlink channel, step 22, comprising information based on the result of the decoding of the first received data transmission, i.e. the message is in this case an ACK. And, if the transmission failed the Node B is sending a message on a downlink channel, step 23, comprising information based on the result of the decoding of the first received data transmission, i.e. the message is in this case a NACK. Node B is adjusting the power on said downlink channel depending on the result of the decoding of the first data transmission or the content in the sent message and the content in the received second data transmission.

If the sent message is an ACK, the Node B is receiving a second data transmission in step 24 from the user equipment, expecting the content in the second data transmission to be a new data transmission, i.e. the content of the second data transmission should differ from the content of the first data transmission. This is checked by looking at the RSN. Thus, if the received second data transmission is a retransmission of the received first data transmission, the power on the downlink channel is increased in step 26, preferably with a predefined step, but if the received second data transmission is a new transmission the power on the downlink channel is decreased in step 27, preferably gradually decreased with a fraction of the predefined step. Optionally, the Node B is deriving an error report when the content in the received second data transmission differs from an expected content and sending the error report to a superior entity such as the RNC 10.

If the sent message is a NACK, the Node B is receiving a second data transmission in step 25 from the user equipment, expecting the content in the second data transmission to be a retransmission, i.e. a repetition of previously transmitted data and/or additional redundancy (check bits) related to previously transmitted data which should be combined with previously transmitted data. Whether the second transmission is a retransmission or not, is checked by looking at the RSN of the second transmission. Thus, if the received second data transmission is a new transmission, the power on the downlink channel is increased in step 26, preferably with a predefined step, but if the received second data transmission is a retransmission of the received first data transmission, the power on the downlink channel is decreased in step 27, preferably gradually decreased with a fraction of the predefined step. It should be noted that NACK's mainly is used for detecting error events when the user equipment 18 not is in soft handover. Optionally, the Node B is deriving an error report when the content in the received second data transmission differs from an expected content and sending the error report to a superior entity such as the RNC 10.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for obtaining efficient radio resource allocation in a mobile communication network, the network comprising a network entity communicating with at least one user equipment transmitting data to the network entity over a radio interface, the method comprising:

receiving a first data transmission from the at least one user equipment;

decoding the first data transmission and obtaining a result of the decoding;

receiving a second data transmission from the at least one user equipment;

sending a message on the downlink channel to the at least one user equipment based on the result of the decoding of the first received data transmission;

determining whether the received second data transmission differs from an expected content by looking at a Retransmission Sequence Number of the received second data transmission; and, adjusting a power on a downlink channel depending on the result of the decoding of the first received data transmission and the content in the received second data transmission, wherein the receiving a first data transmission, the decoding, the obtaining, the receiving a second data transmission and the adjusting are performed on at least one processor, wherein adjusting the power comprises increasing the power on the downlink channel when the content in the received second data transmission differs from an expected content.

2. The method according to claim 1, wherein the power is increased with a predefined step.

3. The method according to claim 1, wherein the sent message is an acknowledgement message and wherein the power is increased if the received second data transmission is a retransmission of the received first data transmission.

4. The method according to claim 1, wherein the sent message is a negative acknowledgement message and wherein the power is increased if the received second data transmission differs from the received first data transmission.

5. The method according to claim 1, wherein the method further comprises:

deriving an error report when the content in the received second data transmission differs from an expected content; and sending the report to a superior communication network entity.

6. The method according to claim 1, wherein adjusting the power comprises the step of decreasing the power on the downlink channel with a predefined step when the content in the received second data transmission corresponds with an expected content.

7. The method according to claim 6, wherein the power is decreased with a predefined step.

8. The method according to claim 6, wherein the sent message is an acknowledgement message and wherein the power is decreased if the received second data transmission differs from the received first data transmission.

9. The method according to claim 6, wherein the sent message is a negative acknowledgement message and wherein the power is increased if the received second data transmission is a retransmission of the received first data transmission.

10. The method according to claim 1, wherein the method further comprises adjusting a power on a further downlink channel different from the downlink channel on which the message is sent.

* * * * *